United States Patent [19]

Dubuque

[11] 4,271,851
[45] Jun. 9, 1981

[54] PROCESS FOR FABRICATING ARTICLES FROM ULTRA HIGH MOLECULAR WEIGHT POLYMER MATERIAL

[76] Inventor: Gerald P. Dubuque, 27 Oak Ave., Cataumet, Mass. 02534

[21] Appl. No.: 849,529

[22] Filed: Nov. 7, 1977

[51] Int. Cl.³ ............................................. B29F 1/00
[52] U.S. Cl. .................................... 264/328; 249/82; 425/546
[58] Field of Search ................ 264/328, 329; 249/82; 425/817 R, 546

[56] References Cited

U.S. PATENT DOCUMENTS

| | | | |
|---|---|---|---|
| 2,668,985 | 2/1954 | Babbitt | 264/328 |
| 3,036,340 | 5/1962 | Waddell | 264/329 |
| 3,600,486 | 8/1971 | Walker | 264/328 |
| 3,663,512 | 5/1972 | Uebe | 264/328 |
| 3,665,068 | 5/1972 | Duling | 264/329 |
| 3,937,778 | 2/1976 | Tanaka | 264/329 |
| 3,946,981 | 3/1976 | Frank | 425/817 R |
| 4,164,531 | 8/1979 | Shiraki | 264/328 |

Primary Examiner—Paul R. Michl
Attorney, Agent, or Firm—John M. Brandt

[57] ABSTRACT

A process for fabricating articles from ultra high molecular weight (UHMW) polymer material is disclosed. The process comprises injecting melted UHMW polymer material into an evacuated compressible sectioned cavity mold and then compressing the sections of the mold to compensate for material shrinkage and to prevent internal laminations.

1 Claim, 1 Drawing Figure

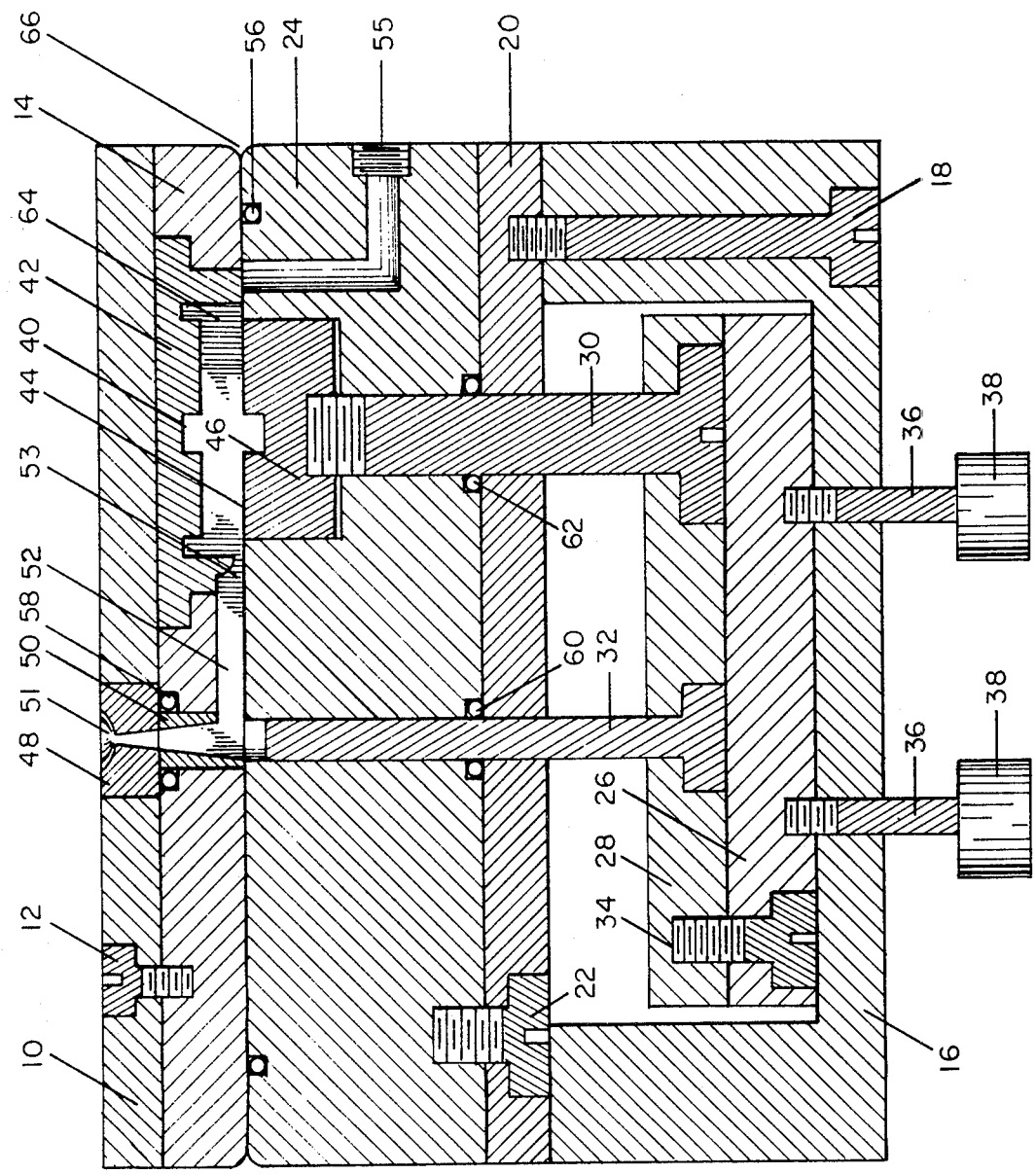

PROCESS FOR FABRICATING ARTICLES FROM ULTRA HIGH MOLECULAR WEIGHT POLYMER MATERIAL

BACKGROUND OF THE INVENTION

1. Field of the Invention:

The invention resides in the field of polymer fabrication and more particularly relates to methods for manufacturing articles of UHMW polymer.

2. Description of the Prior Art:

Ultra high molecular weight polymers, i.e., those having weights between approximately 1.7 and 6 million are known in the industry for their highly desirable characteristics. These include extremely high resistance to impact, abrasion and chemicals as well as high energy absorption and self-lubrication. They have a high electrical resistance, do not absorb water, and have a useful temperature range from −450° to 280° F. and upward. Exact and detailed specifications of particular polymers are available from suppliers of the material which include "1900", trademarked and produced by Hercules Incorporated, Wilmington, Del.; and "Hostalen GUR", trademarked by and available from American Hoechst Corporation, Somerville, N.J. UHMW polymer is also available from Soltex Polymer Corporation, Houston, Tex.

Three fabrication methods are currently used to form UHMW polymers into semi-finished or stock size configurations. These are compression molding, extrusion, and forging. After initial fabrication, semi-finished and stock shapes may be drilled, die cut, planed, sawed, punched, milled and turned. Basically, the material in solidified form can be worked as though it were a wood or metal. However, because of the material's high molecular weight, it has heretofore been incapable of injection molding. This results from the fact that relative to other thermoplastic material, UHMW polymer has no melt index.

Using a conventional ram type injection heating unit, the material can be injected into a mold, but, since the conventional process requires packing with replacement material as the injected material cools and shrinks, laminated layers result throughout. Further, when using the conventional injection molding method, the material crystallizes with exposure to air, producing an article having a non-uniform, sometimes burned surface having occasional voids and sink marks which render the resulting product useless.

As is well known, injection molding is one of the most efficient and economical methods of fabricating plastics and polymers, in that finished or essentially finished parts of complex shape and design may be produced in great quantity at a rapid rate. The present invention overcomes the past inability to injection mold UHMW polymer through a unique combination of steps which comprise a process not known in the prior art.

SUMMARY OF THE INVENTION

The invention may be summarized as a method for fabricating articles of UHMW polymer material by an injection type process. The process requires an evacuatable, compressible sectioned cavity mold which will separate to release the finished article. As in any molding process, the shape of articles produced by the method is limited only by the ability of the user to properly design a suitable mold. After the mold is produced, the steps of the invention comprise: first, evacuating the mold; second, injecting a quantity of melted UHMW polymer into the mold cavity; and, third, compressing the mold sections to compensate for shrinkage, eliminate sinks and voids, prevent internal laminations, and complete the desired article configuration.

The process overcomes the obstacles and disadvantages of injection molding UHMW polymer by the conventional technique as previously described. The combination of steps provides a new method by which this material may be rapidly and economically fabricated into finished articles with ease and precision heretofore unknown.

These and other features and advantages of the invention will be more fully understood from the description of the preferred embodiment and drawing which follow.

DESCRIPTION OF THE DRAWING

The drawing is a cross-sectional illustration of apparatus suitable for use in the method of the invention.

DESCRIPTION OF THE PREFERRED EMBODIMENT

Referring to the drawing, there is shown in cross-sectional representation an evacuatable compressible section cavity mold which is used in the UHMW polymer fabrication process. The mold assembly consists of a top plate 10 secured by bolts 12, one of which is shown, to a first cavity section 14 and a bottom plate 16 secured by bolts 18, one of which is shown, to middle plate 20 further secured by bolts 22, one of which is shown to a second cavity section 24.

A compression assembly slidably mounted within plate 16 consists of a base plate 26 and a top plate 28 which secure compression pin 30 and sprue knockout pin 32. Plates 26 and 28 are fastened together by bolts 34, one of which is shown.

The entire compression assembly is moved upward by hydraulic pistons 36 slidably mounted in plate 16 and activated by hydraulic cylinders 38. The length of travel may be controlled by any convenient means as would be obvious and is not shown.

The upper surface 40 of the cavity into which UHMW polymer is injected is sunk in insert 42 which is in turn contained in plate 14 by plate 10. The bottom surface 44 of the cavity is formed in insert 46 slidably mounted in plate 24 and attached to pin 30. Actuation of the compression assembly moves pin 30 and insert 16 upward and thus the two surfaces 40 and 44 of the cavity together. The mold is therefore formed of two compressible sections which within the latitude of the inserts and undercut restrictions may be of any shape for fabricating articles of communsurate form.

UHMW polymer in a melted state is injected into the cavity through a sprue 51 formed in inserts 48 and 50 contained in plates 10 and 14 respectively. An entrance channel 52 terminating in a gate 53 is further formed in plate 14.

In addition to compressing the mold sections as described above, it is also necessary in the process to evacuate air from the mold to prevent the burning and crystallizing reactions which takes place when UHMW polymer and air come in contact. This is accomplished by sealing all mold joints with O-rings and providing an evacuating passage 55 to which a vacuum may be connected. O-rings are placed at positions in the mold as dictated by the mechanical design of the assembly of which the figure is but one possible example. Typical O-ring positions are 56 between plates 14 and 24, 58 between plate 14 and inserts 48 and 60, 60 between plates 20 and 24 and sprue knockout pin 32, and 62 also between plates 20 and 24 at compression pin 30.

Having described the mold, the process which comprises the invention is as follows: the mold is assembled and evacuated, UHMW polymer is melted at about 450° F. and injected into the mold at sprue 51 from which it travels into and fills the cavity 64 between surfaces 40 and 44, the compression assembly is then activated closing the mold sections or surfaces together to the final dimension of the finished article. After cooling, the mold is separated along parting line 66 and the article removed by further actuation of the compression assembly to lift the article and the attached sprue from the lower part of the assembly. The article is then finished in the conventional manner by removing the sprue and machining if such is required.

Modifications will be obvious to those skilled in the art. For example, the mold may be chambered to cast more than one article per injection. Appropriate timing and automation equipment may be employed to operate the molding process on a repeatable cycle. Accordingly the invention is defined by the following claims.

What is claimed is:

1. A process for fabricating an article from ultra high molecular weight polymer material comprising in combination the steps of:
   a. providing a cavity mold of the article to be fabricated, said mold having at least two sections, at least one of which is compressible against the other;
   b. evacuating the air from said cavity mold;
   c. melting a quantity of said polymer;
   d. injecting a sufficient quantity of said melted polymer into said cavity mold to fill said mold;
   e. compressing said mold sections;
   f. cooling said mold and said article; and
   g. ejecting said article from said mold.

* * * * *